United States Patent [19]

Bernard et al.

[11] Patent Number: 5,438,321
[45] Date of Patent: Aug. 1, 1995

[54] LOCATION SYSTEM

[76] Inventors: Hermanus A. Bernard, 734 Wiedrigh Street; Francois D. Joubert, 489 Amy Street, both of Moreletapark, Pretoria Transvaal; Robert D. Crook, 30 Francolin Street, Flamingo Park, Welkom Orange Free State, all of South Africa

[21] Appl. No.: 103,774

[22] Filed: Aug. 10, 1993

[30] Foreign Application Priority Data

Oct. 11, 1991 [ZA] South Africa ........................ 91/8124
Oct. 12, 1992 [ZA] South Africa ........................ 91/7827

[51] Int. Cl.⁶ ............................................ G08B 23/00
[52] U.S. Cl. ........................... 340/573; 340/825.49; 340/539; 340/636; 340/660
[58] Field of Search .................... 340/573, 539, 825.49, 340/825.54, 825.31, 825.32, 825.33, 825.34, 312, 636, 660; 342/457

[56] References Cited

U.S. PATENT DOCUMENTS

| | | | |
|---|---|---|---|
| 4,275,385 | 6/1981 | White | 340/312 |
| 4,275,385 | 6/1981 | White | 340/312 |
| 4,491,971 | 1/1985 | Webb et al. | 340/539 |
| 4,495,496 | 1/1985 | Miller, III | 340/825.54 |
| 4,598,275 | 7/1986 | Ross et al. | 340/573 |
| 4,709,330 | 11/1987 | Yokoi et al. | 364/400 |
| 4,955,000 | 9/1990 | Nastrom | 367/117 |
| 4,998,095 | 3/1991 | Shields | 340/574 |

FOREIGN PATENT DOCUMENTS

| | | |
|---|---|---|
| 0333459 | 9/1989 | European Pat. Off. . |
| 0357309 | 3/1990 | European Pat. Off. . |
| 0446979 | 9/1991 | European Pat. Off. . |
| 0489467 | 6/1992 | European Pat. Off. . |
| 2016770 | 9/1979 | United Kingdom . |
| 2186404 | 8/1987 | United Kingdom . |
| 2187317 | 9/1987 | United Kingdom . |
| 2190525 | 11/1987 | United Kingdom . |
| 2193359 | 2/1988 | United Kingdom . |
| 2218835 | 11/1989 | United Kingdom . |
| 2229302 | 9/1990 | United Kingdom . |
| 2248710 | 4/1992 | United Kingdom . |

OTHER PUBLICATIONS

Database WPI, Week 9043, Derwent Publications, Ltd., AN-90-327645.

*Primary Examiner*—John K. Peng
*Assistant Examiner*—Benjamin C. Lee
*Attorney, Agent, or Firm*—Jacobson, Price, Holman & Stern

[57] ABSTRACT

A location system for tracking miners underground includes a number of identification stations connected to a central control station. Miners are issued with portable identification modules which are fitted to their caplamps and which are powered by their battery packs. The identification modules transmit unique identification signals at intervals, which are picked up by the identification stations. The identification modules change the intervals between successive transmissions continually, and the identification stations can read overlapping transmissions, so that the reliability of detection is good. Miners who are issued with a caplamp first pass an identification card through a reader, which reads a unique personal identification code from the card. This code is correlated with the identification code of the identification module in the caplamp at the central control station. The invention includes a portable location device for tracking lost miners, which is a direction finding receiver adapted to receive and display the identification code transmitted by the identification module of a lost miner. The identification codes of members of a search party are stored in the device, so that they are ignored in use.

16 Claims, 8 Drawing Sheets

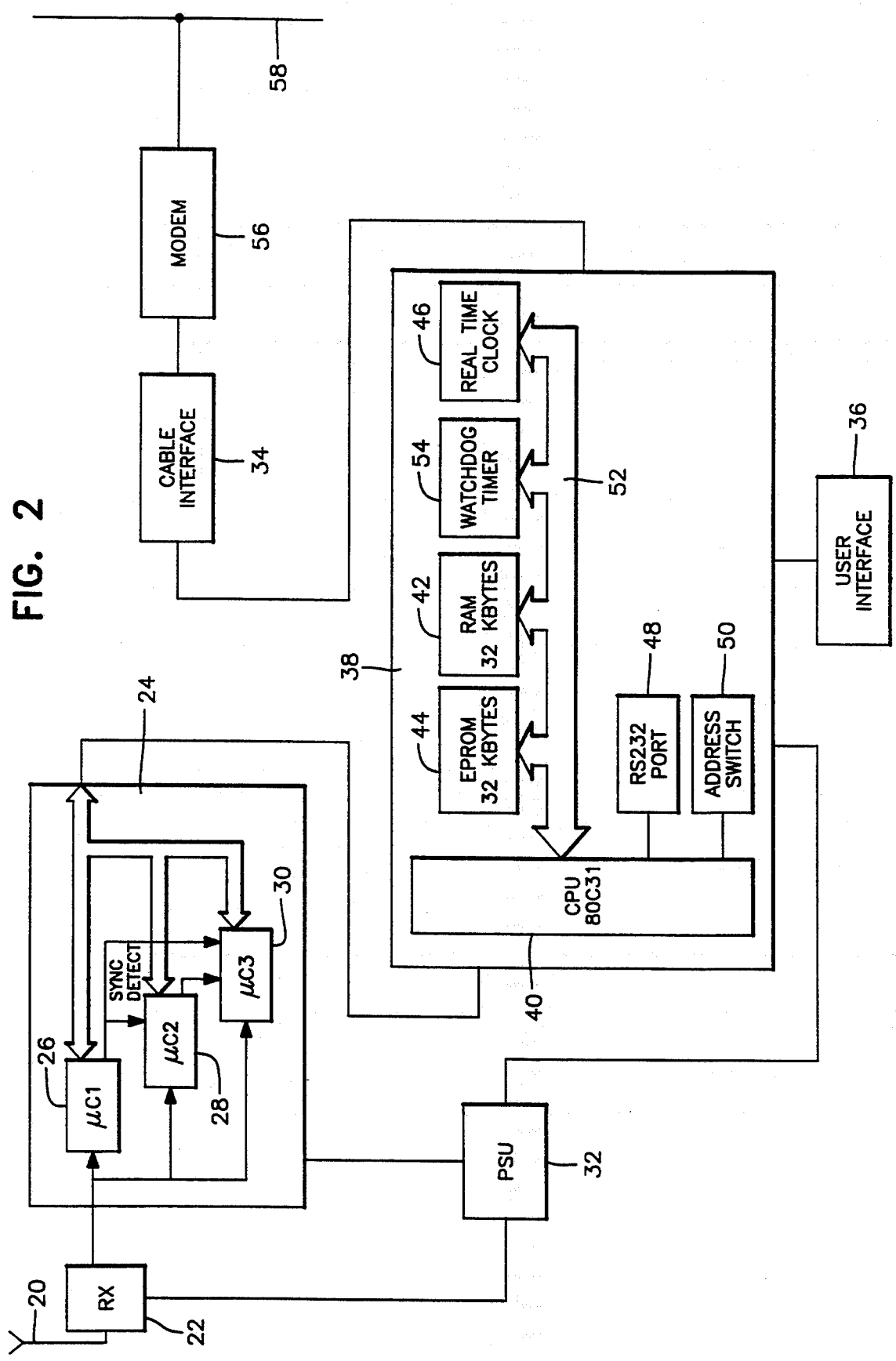

LOCATION SYSTEM

BACKGROUND OF THE INVENTION

This invention relates to a location system which can be used, for example, to locate personnel or vehicles in an underground mine.

Various location systems are known which use passive transponders or low-powered active devices with miniature internal batteries. Such devices have very short operating ranges, of the order of 1 m or less. This requires identification or location systems using such devices to rely on movement restricting systems such as turnstiles or automatic doors to channel personnel issued with the devices past an identification station.

In certain environments, such as underground mines, such impediments to free movement may be impractical or may be unacceptable for safety reasons. In addition, it may desirable to implement a more flexible location system, which is difficult if identification stations include movement restricting structures such as those referred to above.

SUMMARY OF THE INVENTION

According to a first aspect of the invention a location system comprises a plurality of portable identification modules, a plurality of identification stations, and a control station, each identification module comprising:
  a transmitter; and
  first processor means arranged to store an identification code and to enable the transmitter periodically to transmit an output signal including the identification code, with an interval between the transmission of successive output signals which varies from one transmission to the next;
each identification station comprising:
  a receiver for receiving the transmitted identification code from each of the identification modules;
  at least one second processor means adapted to identify valid identification codes received by the receiver and to output the identified codes; and
  a communications interface arranged to transmit the identified codes to the control station together with an identification station code corresponding to the respective identification station;
the control station comprising:
  third processor means for receiving codes from identification stations and generating a display signal according to the identification modules detected by respective identification stations; and
  display means for providing a display indicating the positions of the identification modules.

The portable identification module may be arranged to be powered by a battery which powers a miner's caplamp.

Preferably the first processor means of the identification module is adapted to detect connection of the caplamp to a battery charging circuit, and to modify its output signal while a charging voltage is present.

The first processor means may be adapted to shut off the transmitter of the identification module if the charging voltage is present for longer than a predetermined period of time.

The third processor means of the control station is preferably adapted to store the identification code of each identification module and to relate the stored identification codes to respective personal identification codes of persons issued with the identification modules.

In a preferred embodiment of the invention, at least one identification station serves as a reporting point and includes a battery charging terminal, token reading means for reading a token identifying a person, and processor means for relating a personal identification code read from the token to the identification code of the identification module in a caplamp which is being charged, so that when the caplamp is issued to that person, the person's identity can be determined from the identification code of the caplamp.

The token may be a magnetic stripe card or a barcode card, and the token reader may be a magnetic card reader or a barcode reader.

The first processor means of the identification module is preferably adapted to vary the interval between the transmission of successive output signals between a first, minimum interval and a second, maximum interval, in a random or pseudo random manner.

The difference between the maximum and minimum intervals is preferably substantially less than the length of both the maximum and minimum intervals.

The duration of each output signal is preferably less than 1% of the difference between the maximum and minimum intervals, and is typically 0.1% of the difference.

The second processor means of each identification station may comprise a plurality of processors which are interconnected, so that each of the plurality of processors can identify a respective identification code from received output signals which overlap at least partially in time.

According to a second aspect of the invention there is provided a portable location device for use with the system defined above and which is responsive to the output signals of the identification modules, the portable location device comprising:
  an antenna;
  an adjustable attenuator;
  a receiver;
  fourth processor means; and
  display means,
the fourth processor means being adapted to generate a display signal when an identification signal is received.

The fourth processor means may be adapted to store selected identification codes of identification modules of personnel operating the location device, so that transmission of those identification codes is ignored by the location device.

Preferably, the fourth processor means is adapted to generate a display on the display means corresponding to the identification code of a received identification signal, and to store the selected identification codes in memory means, the identification codes of subsequently received identification signals being compared with the stored identification codes, and being displayed only if they do not correspond with any of the stored identification codes.

According to a third aspect of the invention there is a provided a portable identification module for use in the system defined above, the portable identification module comprising a transmitter and first processor means arranged to store an identification code and to enable the transmitter periodically to transmit an output signal including the identification code, with an interval between the transmission of successive output signals which varies from one transmission to the next.

The identification module may be housed in the headpiece of a miner's caplamp, or in a housing for a battery pack of the caplamp.

BRIEF DESCRIPTION OF THE DRAWINGS

FIG. 2 is a simplified block schematic diagram of a tunnel identification station according to the invention;

DESCRIPTION OF AN EMBODIMENT

Figure 1:
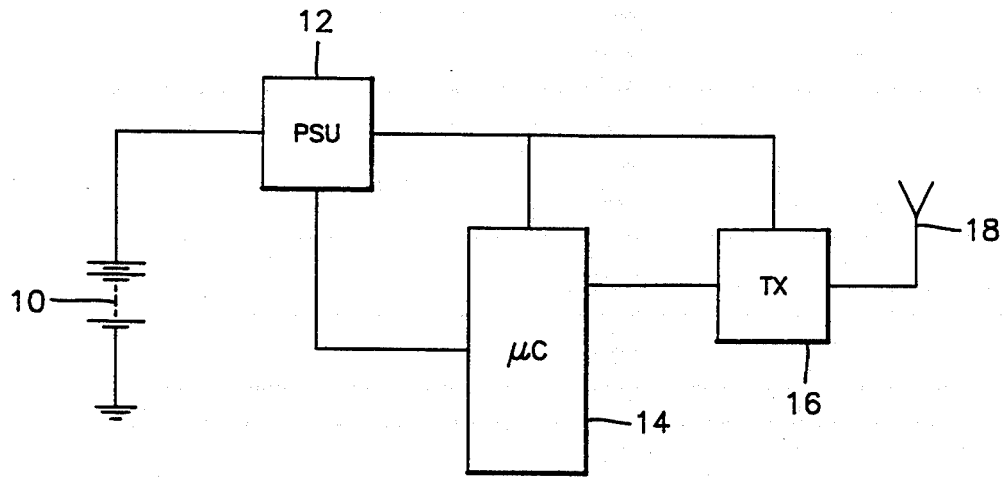
FIG. 1 is a simplified schematic block diagram of a personnel identification module according to the invention.

Referring first to FIG. 1, a portable identification module is illustrated schematically. In an embodiment of the invention which is adapted for the detection of personnel in a mine, the identification module is a compact circuit which is mountable in the headpiece of a miner's caplamp, which has a cavity which normally contains a methane sensor. Instead, the identification module can be housed in the cover of the battery pack which powers the caplamp. The cover is then modified to accommodate the module. The identification module is connected to a battery 10 which powers the caplamp and which is commonly a four volt lead-acid rechargeable battery. A DC to DC inverter power supply circuit 12 regulates the battery output and provides a 12 volt supply to a microcontroller 14 and a transmitter circuit 16, which is connected to an antenna 18. The transmitter 16 is a modified Hartley oscillator based around a single transistor, with an operating frequency determined by an LC combination. The inductance L is fixed and is determined by a strip line inductor formed on a printed circuit board, while the capacitance C can be varied to adjust the operating frequency, which is typically between 402 and 406 MHz. The transmitter 16 can be enabled or disabled selectively by the microcontroller 14.

Figure 6:
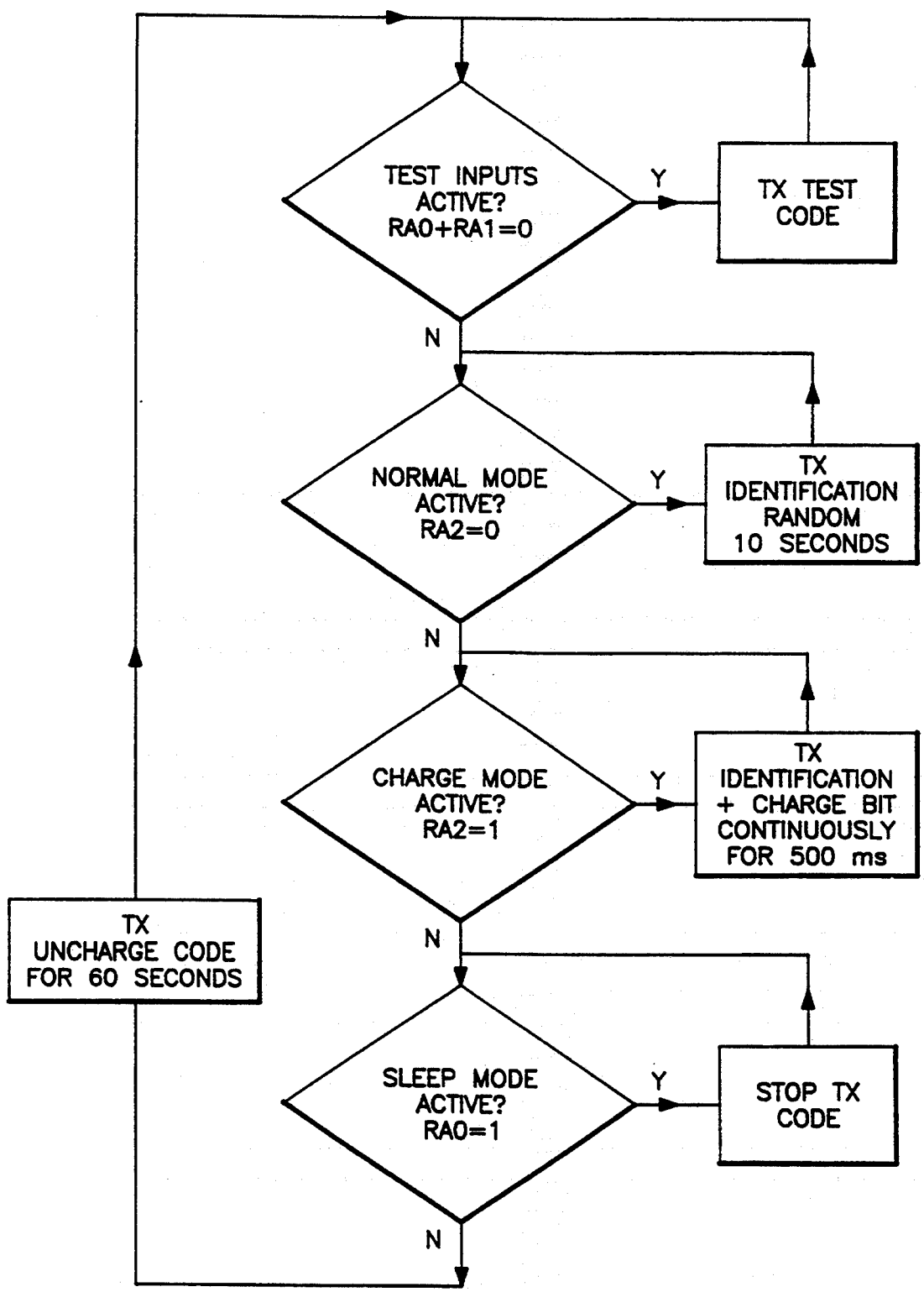
FIGS. 6 to 8 are simplified flow charts indicating the operation of the systems of FIGS. 1 to 4, respectively.

The microcontroller 14 used in the prototype identification module is a PIC 16C5X 8 bit CMOS device manufactured by Microchip Technology Inc. The device has 12 input/output pins which are allocated as follows:

RA0, RA1, RB0 to RB7 = identification code
RA2 = charge detection
RA3 = transmitter controller The microcontroller operates under the control of software stored in an EPROM area of the device, and has five operating modes: a test mode, a normal transmission mode, a "charge detect" mode, a "sleep" mode and a "charge-stop detect" mode. Operation of the identification module in the various modes is illustrated graphically in the flow chart of FIG. 6.

The test mode is used in production testing of the identification module. If the inputs RA0 and RA1 are connected to zero volts, the microcontroller enters the test mode and first enables the transmitter which transmits a carrier at its operating frequency for 3 seconds to allow measurement and adjustment of the carrier frequency. The microcontroller then controls the transmitter to modulate the carrier with a bit rate of 300 $\mu$s per bit for 5 seconds, to ensure that the crystal is on the correct frequency. The microcontroller then outputs an MN53200 code (000011111111) for 5 seconds. Assuming that the above transmissions are correct, a decoder in a receiver module will indicate that the identification module is operating correctly.

During the normal transmission mode, a packet of digital data is transmitted at intervals of between 6 and 8 seconds. After each packet of data has been transmitted, the delay or waiting period until the next transmission is altered in a random or pseudo random manner. Thus, the interval between successive messages or packets of data varies over a two second range, in a manner which is random for practical purposes. With a typical message length of approximately 20 ms, the range of possible variations in the interval between transmissions is therefore 1000 times greater than the length of the message itself. The message length is preferably no more than 1%, and in this case only 0.1% of the difference between the maximum interval and the minimum interval between transmissions. The difference between the maximum and the minimum intervals is also between one third and one quarter of the total interval between messages. This reduces the likelihood of a number of different identification modules transmitting their data simultaneously. In practice, of course, difference identification modules will be activated at different times, further reducing the likelihood of interference between transmissions.

The data is transmitted at a bit rate of 3 kilobits per second, by modulating the carrier on and off. The data is transmitted in the following 4 byte format:

Byte 1 = 1110AABC followed by 10
 1110 = synchronization bits
 AA = 00 for 4 byte packet
 B = 1 (Charge detect mode)
 C = 1 (Charge-stop detect mode)
Byte 2, byte 3 = ID Code. (Read in via the microcontroller's input pins during manufacture)
Byte 4 = EEEEFFFF
 EEEE = Fixed Group code
 FFFF = XOR of all the nibbles excluding the sync bits Each byte is followed by a stop and a start bit.

Bytes 2 and 3 contain a unique identification code which is pre-programmed into the microcontroller during manufacture of the module. More than 100 000 different codes are available, which is more than adequate for the intended application of the module.

In the "charge detect" mode of operation, the microcontroller monitors the input RA2 for a HIGH or "1" which occurs when the miner's caplamp is connected to a charging and clocking point (see below). The microcontroller changes bit B in byte 1 to a "1", and decreases the interval between successive data transmissions to 15 ms. The microcontroller continues in this mode for a maximum of 500 ms. If the input RA2 reverts to "0" in the 500 ms period, indicating that the caplamp has been removed from the charging/clocking point, the module reverts to the normal transmission mode. If the input RA2 remains HIGH for longer than 500 ms, the microcontroller enters the "sleep" mode, during which no transmissions take place.

In the "charge-stop detect" mode, the microcontroller will resume its transmissions. However, bit C of byte 1 will be set to "1" for 60 seconds. This mode can be used to detect caplamps that have just been removed from a charging point. After 60 seconds, the module will revert to the normal transmission mode.

The identification modules are small and rugged, and consume less than 30 mA, which is minimal compared to the current drawn by the caplamp itself, which is of the order of 1 A. The unit can continue to operate when the battery voltage drops from a nominal 4 volts to approximately 3 volts.

Turning now to FIG. 2, a tunnel identification station is shown schematically. The station includes a receiving antenna 20, a radio receiver 22 which is tuned to receive the signal transmitted by the transmitter 16, and a pre-processor front-end circuit 24 which comprises three microcontrollers 26, 28 and 30. The receiver 22 and the pre-processor front-end 24 are mounted on a common interface card, together with a power supply module 32, a cable interface module 34 and a user interface module 36. The pre-processor 24 is connected to a CPU card 38. The CPU card includes a type 80C31 microprocessor 40, a random access memory (RAM) 42 of 32 kilobytes, an EPROM 44 of 32 kilobytes, a date/time calendar module 46, an RS 232 serial port 48, an 8-bit address port 50, an I/O bus 52, and a watchdog timer 54. The CPU card 38 is connected to a modem 56 which communicates with a central control station via a cable 58. The cable 58 is preferably the existing communication cabling of an underground mine fire detection system, for example, eliminating the need for new cabling.

The receiver 22 is a carrier detect receiver, and outputs a "0" when a carrier is received, and a "1" when no carrier is received. This output is sent to the pre-processor front-end 24 for decoding. The receiver 22 is also fitted with an MN53200 decoder, which can be used to test the RF section of the receiver.

The microcontrollers 26, 28 and 30 in the pre-processor front-end all monitor the output signal from the receiver 22 continuously, and are interconnected to ensure correct detection of a valid data packet after reception of a corrupted data packet, due to the simultaneous or overlapping transmission of two data packets by two different identification modules.

When the first microcontroller 26 detects a synchronization code in the output signal from the receiver 22, it signals to the second and third microcontrollers 28 and 30 that it has received a synchronization signal. The second microcontroller 28 then searches for a synchronization code in the output signal from the receiver. When such a code is detected, the second microcontroller signals to the third microcontroller 30 that a synchronization code has been detected, and the third microcontroller 30 will then start searching for a synchronization code. The effect of this is that a different microcontroller locks onto the received signal each time a synchronization code, which indicates the start of an identification signal, is received, even when several signals overlap. This increases the detection rate of identification signals, which are transmitted at random intervals, significantly.

The cable interface 34 receives the output of the RS232 port 48 and modulates the logic levels of the port output to a selected channel on the cable 58 via the modem 56 using frequency shift keying (FSK).

The power supply unit 32 is a linear regulator with current limiting, and accepts an input voltage between 20 and 40 volts DC. The user interface 36 comprises a number of light emitting diodes (LED's) which indicate the following functions of the identification station:
1. TX—data to cable—display logic level to modem
2. RX—data from cable—display logic level received from modem
3. Packet received detect—display logic level received from RF receiver
4. TX—enable
5. Relay 1 ON The identification station is housed in a nested pair of glass fibre reinforced polyester boxes. An outer box is used to terminate cables entering the identification station via cable glands, while a second, inner box houses the electronic circuitry. A screw-on connector is used to allow easy removal of the inner box from the outer box. The LED's that indicate the status of the unit are visible through a transparent lid.

Figure 7:
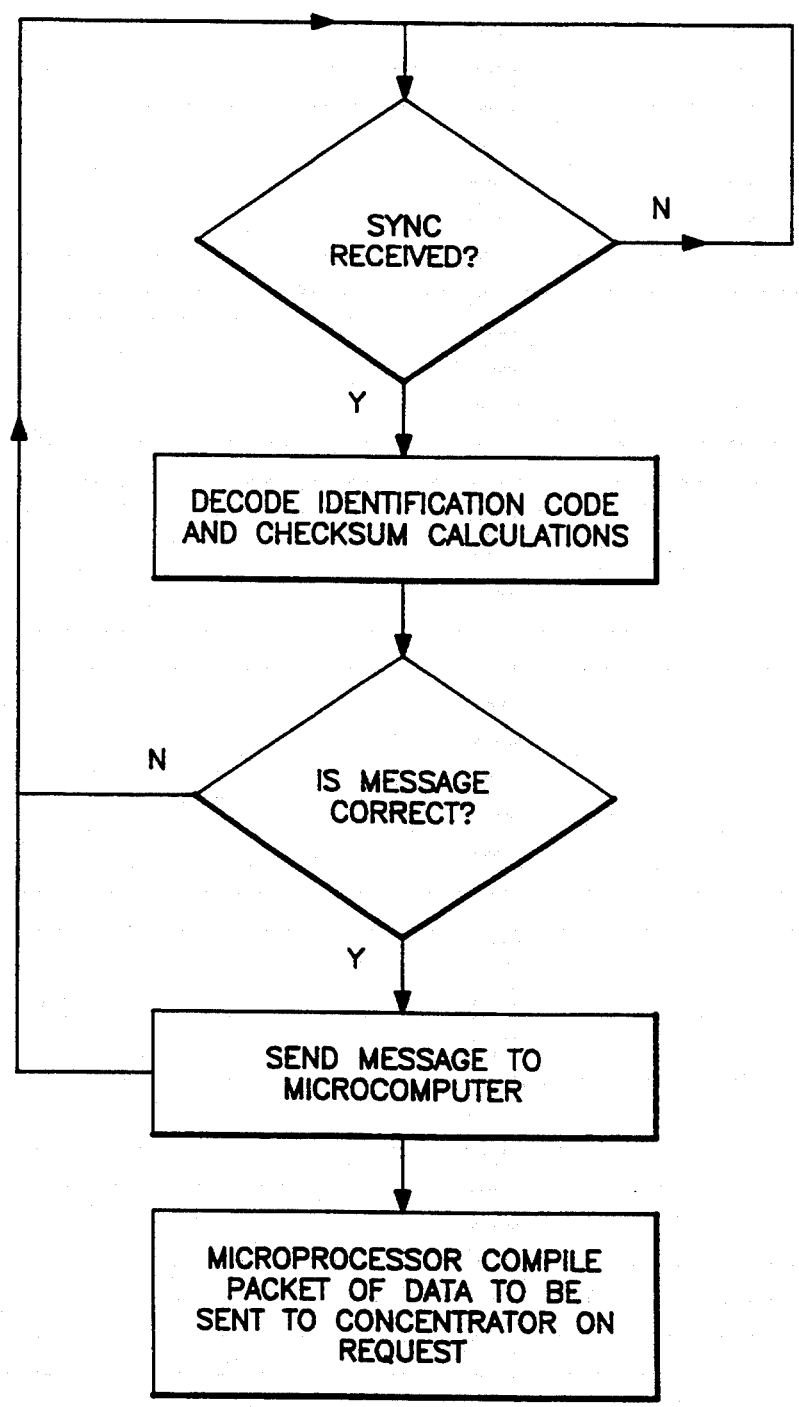

The reception range of the identification station is approximately 25 m (minimum) on the surface. In practice, the detection range is ample for use in mine tunnels, and eliminates the necessity for restricting the movement of personnel carrying the identification modules. As personnel pass each identification station, the station receives respective identification signals and decodes them, thus identifying the location of the personnel. The accuracy of location depends, of course, on the distance between identification stations. The transmission interval is selected, in combination with the detection range of the identification station, to ensure reliable detection even when a group of personnel pass an identification station together. Typically, two or three transmissions from each identification module will occur while personnel pass within range of the identification station, reducing the likelihood of non-detection. The identification code of each identification module detected, together with the identification station's own identification code, is transmitted to the control station via the cable 58, allowing the position of each person carrying an identification module to be monitored centrally. Operation of the tunnel identification station is illustrated by the flow chart of FIG. 7.

Figure 4:
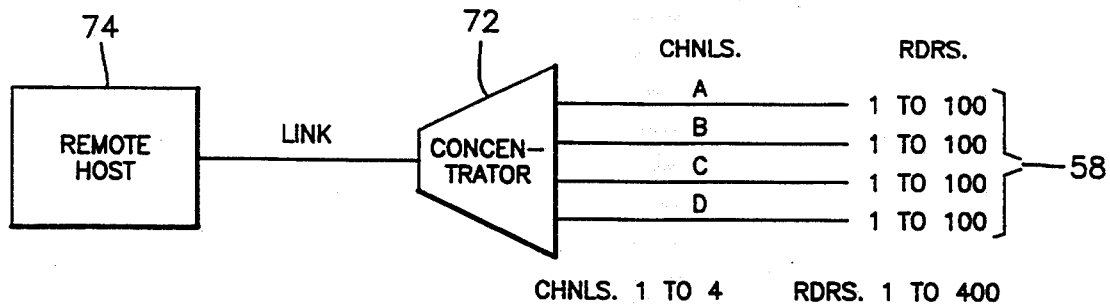
FIG. 4 is a simplified block schematic diagram of a central control station according to the invention.
Figure 3A:
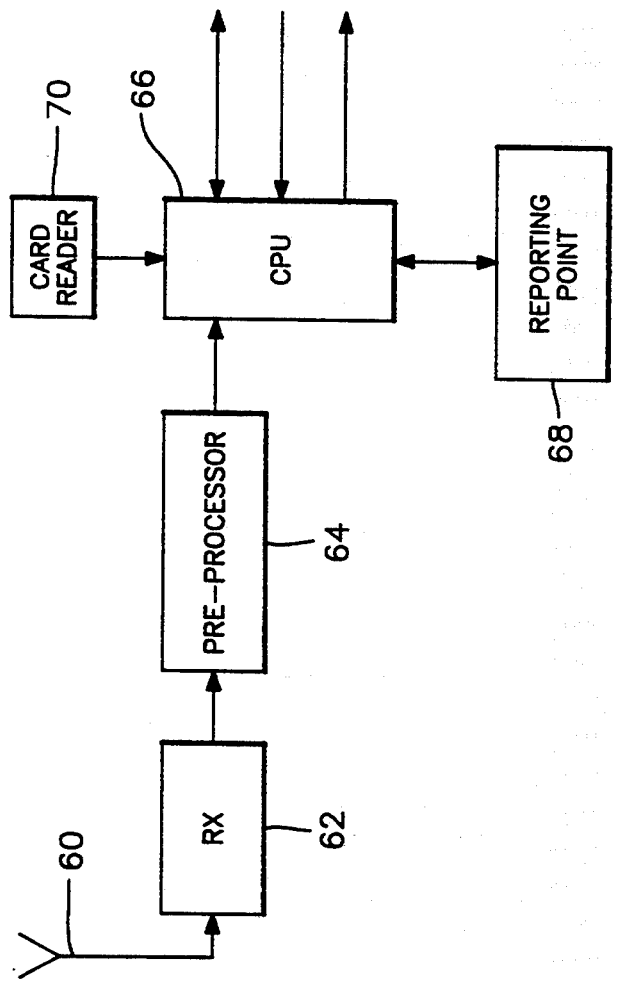
FIG. 3a is a simplified block schematic diagram of a surface identification station according to the invention.

FIG. 4 illustrates a central control station of the system. In FIG. 4, a data concentrator comprising a first microcomputer 72 is connected to the cable 58 which carries four channels A, B, C and D, each serving 100 identification stations. The microcomputer 72 functions as a concentrator which is implemented in software and which polls the identification stations and collects data from them. The collected data is sent to a second microcomputer 74 which runs an application program for processing the received data. For example, a conventional data base program may be run on the microcomputer 74 to record the data received from the identification station. The following data is recorded:
 a) Channel and identification station number
 b) Time and date of recorded event
 c) Event: enter or exit area
 d) Identification code FIG. 3a shows a surface identification station or surface identification reader (SIR) which forms part of the location system. The surface identification station includes a receiving antenna 60, a radio receiver 62 (similar to the radio receiver 22 of the tunnel identification station of FIG. 2), a preprocessor front-end 64 (similar to the pre-processor 24 of the tunnel identification station of FIG. 2) and a central processing unit 66. The CPU 66 is connected to a report point 68, where caplamps are plugged in for charging and reporting. A magnetic stripe card reader or bar-code reader 70 is also connected to the CPU 66, for reading personnel identification cards.

Figure 3B:
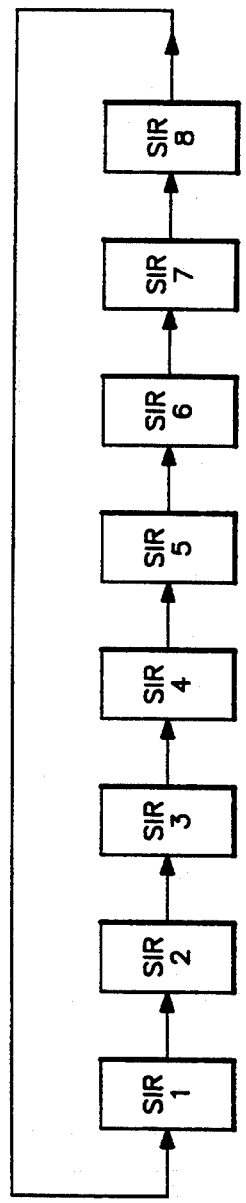
FIG. 3b is a block diagram showing a plurality of the surface identification stations of FIG. 3a connected together.

As shown in FIG. 3b, a number of surface identification stations SIR1 to SIR8 are interconnected in a "daisy chain" configuration which operates as follows. Each surface identification station has a daisy chain input and a daisy chain output. At the start of a cycle, all outputs are set to "0". When a cycle begins, the first station SIR 1 will set its output to "1". This informs the second station SIR 2 that it may proceed with a read cycle. When the second station SIR 2 has completed its read cycle, it will set its daisy chain output to "1", enabling the third identification station SIR 3, and so on. Once all the surface identification stations have completed a read cycle, all of the daisy chain outputs will be set to "1". The first identification station SIR 1 will then output a "0", and the cycle will be repeated.

When a surface identification station is activated by a change of state on its daisy chain input, the CPU 66 checks whether a caplamp is connected to the charging socket of the reporting point 68. This is done by monitoring the voltage at the charging terminals of the socket. If a voltage corresponding to the battery voltage of a caplamp is detected, the reporting point applies a charging current to the battery via the socket contacts. This has the effect of raising the voltage at the battery terminals. The voltage increase is sensed by the portable identification module in its "charge detect" mode of operation (described above), causing the identification module to alter its output accordingly. The surface identification reader receives the identification code from the identification module, and transmits the code to the CPU 66.

Figure 8:
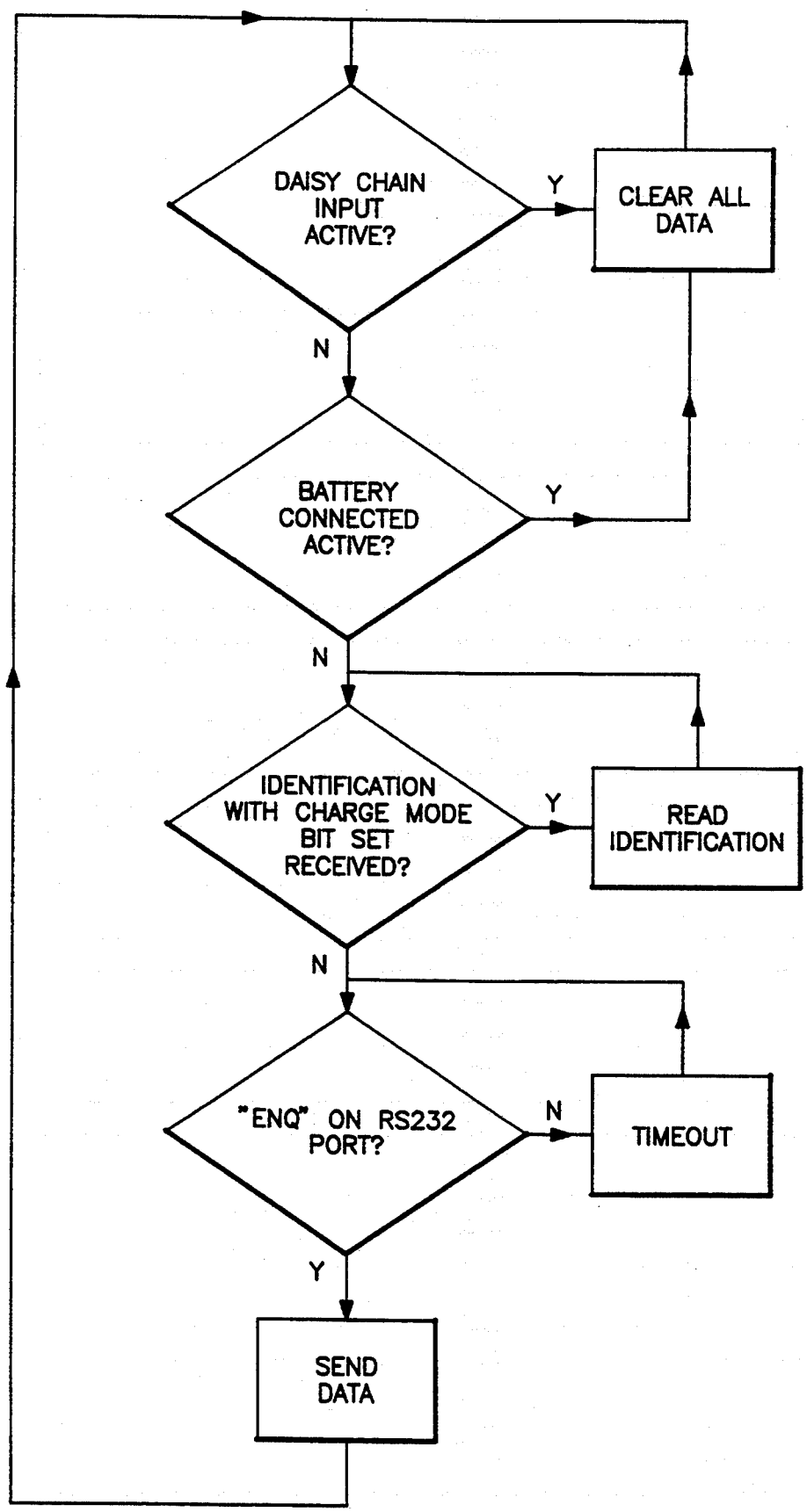

The caplamp user is prompted to pass his or her magnetic stripe card (or barcode card) through the card reader 70 which reads a code from the magnetic stripe or the barcode on the card, identifying the card holder. The code is typically a unique identity number. This code, together with the code from the portable identification module, is transmitted to the host computer 74 to update its data base and ensures that individual personnel can be identified by linking their unique identification numbers or codes with the identification code of the portable identification module in a caplamp with which they have been issued. It will be appreciated that the described system does not require an individual to use the same caplamp continuously. This accords with conventional practice in mines, where miners select a caplamp at random when going on shift. The operation of the surface identification station is illustrated by the flow chart of FIG. 8.

Figure 5A:
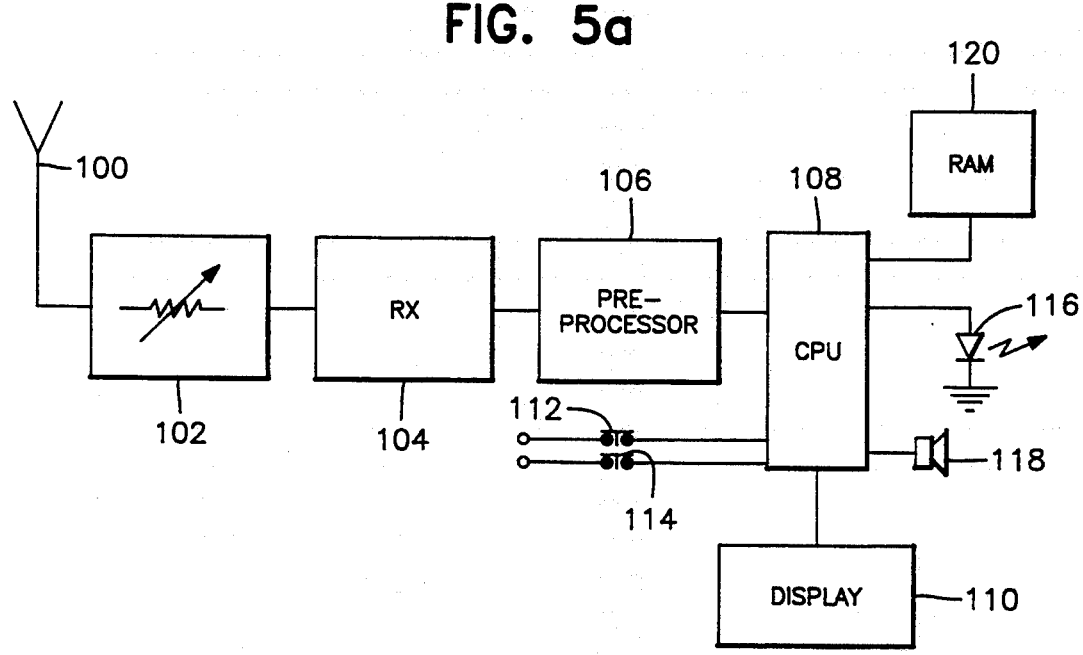
FIG. 5a is a simplified block schematic diagram of a mobile location module according to the invention.
Figure 5B:
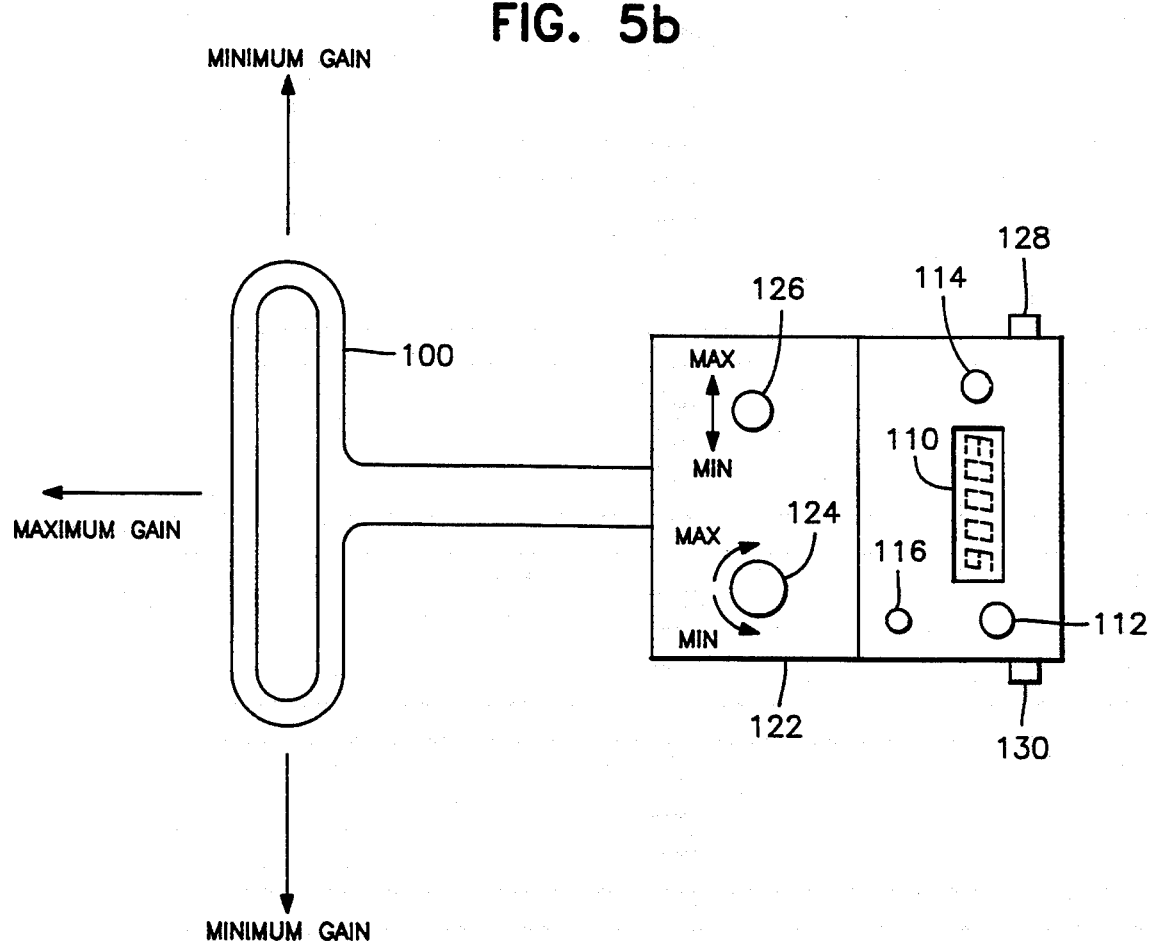
FIG. 5b is a pictorial illustration of the mobile location module.

FIGS. 5a and 5b illustrate a portable location device which forms part of the location system. The portable location device can be used, for example, to locate personnel after a rockfall or other accident. Referring first to FIG. 5a, the location device comprises a receiving antenna 100, a variable attenuator 102, a radio receiver 104 and a front end preprocessor 106. (The receiver and the front end preprocessor are similar to the receivers 22 and 62 and the front-ends 24 and 64.) The portable location device further comprises a central processing unit 108 with RAM 120, and a display 110. Connected to the CPU 108 are two control push buttons 112 and 114, an indicator LED 116 and a miniature buzzer 118. The portable location device is powered by rechargeable batteries, which are charged via a charging socket 128, and is controlled by an on/off switch 130.

FIG. 5b illustrates a practical embodiment of the portable location device. The device comprises a robust hand held housing 122, which can conveniently be hand held. Extending from the front of the housing is the antenna 100, which is a folded dipole antenna which has a maximum gain in a forward direction, as indicated by the arrow in FIG. 5b, and minimum gain to the sides.

Thus, the signal which is received by the device is strongest when it is pointed directly at the source of the signal. The attenuator 102 is controlled by a rotary switch 124 which adjusts the attenuation in six steps of 10 dB each, together with a two position switch 126 which switches 60 dB of attenuation in or out. The maximum attenuation possible is therefore 120 dB. The output of the attenuator is fed to the receiver 104, which is well screened so that it receives RF signals only via the antenna 100.

The portable location device is used to locate missing personnel by adjusting the attenuator 102 until a received identification signal is lost, and searching until the signal is detected once again. By repeating this process, a rescue team using the location device can come closer and closer to a missing person.

The receiver 104 supplies digital data from a received identification signal to the preprocessor 106, which comprises a microcontroller. The microcontroller decodes the signal from the receiver and looks for valid checksums in the messages. If a valid message is received, it is sent to the CPU 108. The CPU has a battery backed-up RAM to store all the messages from the preprocessor 106.

Because members of the rescue team will most likely be carrying personnel identification modules themselves, the identification codes of these modules can be stored in the RAM of the CPU 108, so that the portable location device ignores these codes in use. On switch-on of the device, the operator presses both push buttons 112 and 114 to clear the memory of the CPU of previously received identification signals. The device now begins to receive identification signals, and flashes the LED 116 and sounds the buzzer 118 each time a new identification signal is detected. The buzzer can be disabled if required. When embarking on a search for lost miners, the identification signals of the personnel making up the search party will be received by the device. The code carried in each received signal is displayed on the display 110 and can be held by pressing the push button 112. If the push button 114 is operated simultaneously, this code is cancelled, and the cancelled code is stored in the RAM 120. By repeating this procedure, the identification codes of all members of the search party can be cancelled. As it receives these codes, the location device will "ignore" them, and will not flash the LED 116 or operate the buzzer 118, nor display those codes.

To use the device, the attenuator is set to minimum attenuation, and the operator of the device moves around in the area where missing personnel are expected to be found until an identification signal is received. This causes the LED 116 to flash and the buzzer 118 to sound. The identification code contained in the identification signal is displayed on the display 110. The LED and the buzzer will operate each time the signal is received. The attenuation is now increased until the signal is no longer detected, and the search proceeds until the signal is detected again. By repeating these steps, the distance between the location device and the missing miner is reduced to within a few meters or less, so that even if the miner is buried in debris, he or she can be extricated relatively rapidly.

Figure 9:
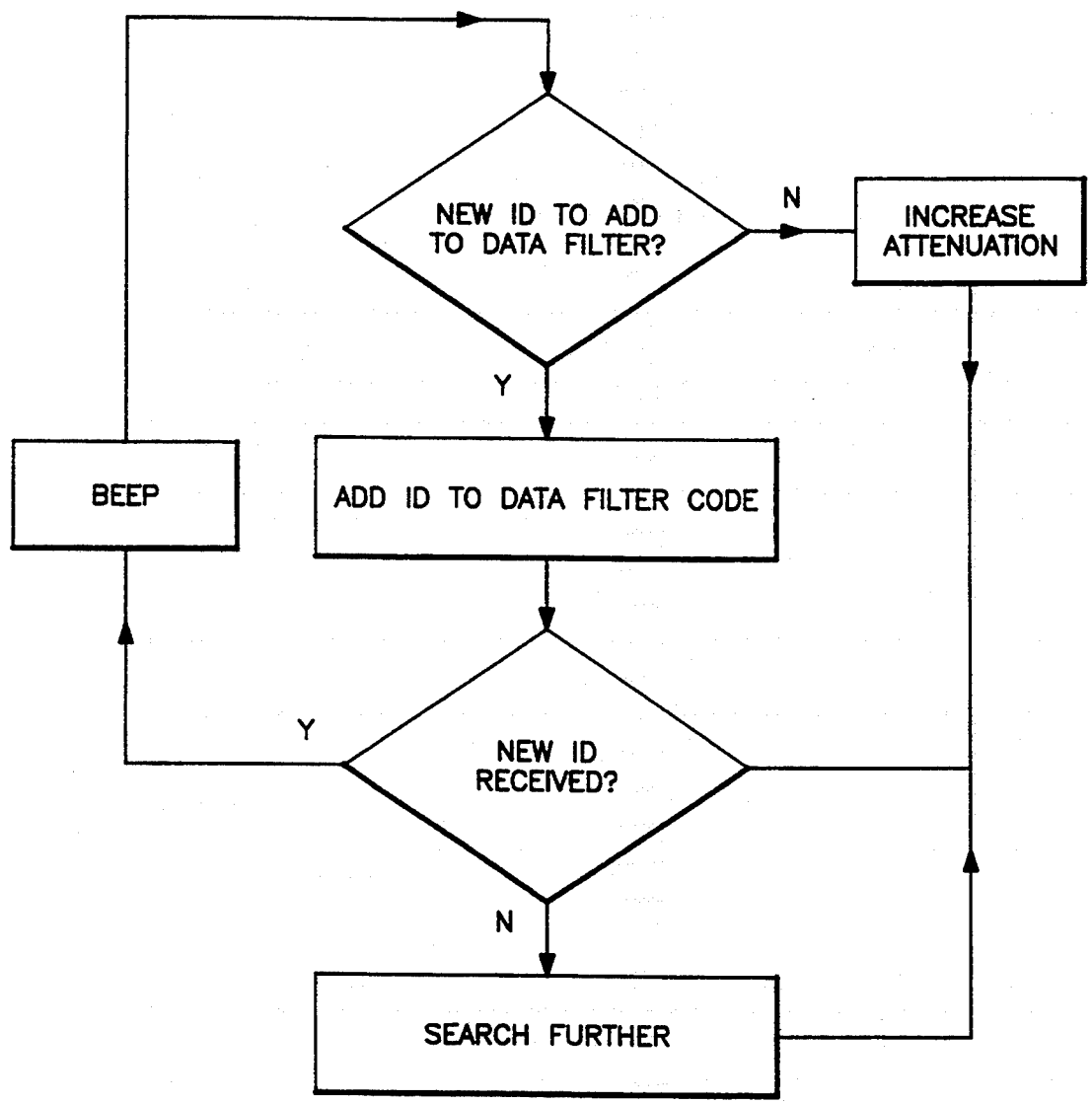
FIG. 9 is a simplified flow chart indicating the operation of the mobile location module of the FIGS. 5a and 5b.

Operation of the portable location device is illustrated by the flow chart of FIG. 9.

We claim:

1. A location system comprising a plurality of portable identification modules, a plurality of identification stations, and a control station, each identification module comprising:
   a transmitter; and
   first processor means arranged to store an identification code and to enable the transmitter periodically to transmit an output signal including the identification code, with an interval between the transmission of successive output signals which varies from one transmission to the next;
   each identification station comprising:
   a receiver for receiving the transmitted identification code from each of the identification modules;
   at least one second processor means adapted to identify valid identification codes received by the receiver and to output the identified codes; and
   a communications interface arranged to transmit the identified codes to the control station together with an identification station code corresponding to the respective identification station;
   the control station comprising:
   third processor means for receiving codes from identification stations and generating a display signal according to the identification modules detected by respective identification stations; and
   display means for providing a display indicating the positions of the identification modules,
   wherein at least one of said plurality of identification stations serves as a reporting point and includes a battery charging circuit for charging an identification module and token reading means for reading data from a token identifying a person; and means for correlating a personal identification code read from the token to the identification code of an identification module being charged with issuing to said person, so that said person's identity can be determined from the identification code of the identification module.

2. The location system according to claim 1 wherein at least one of said portable identification modules is arranged to be powered by a battery which powers a miner's caplamp.

3. The location system according to claim 2 wherein the first processor means of said at least one of the portable identification modules is adapted to detect connection of the caplamp to said battery charging circuit, and to modify the output signal of said at least one of the portable identification modules while a charging voltage is present.

4. The location system according to claim 3 wherein said at least one of said plurality of identification stations which serves as a reporting point includes a battery charging terminal connected to said battery charging circuit, and means for transmitting the identification code of one of said plurality of identification modules when connected thereto, together with the personal identification code read from said token, to the control station.

5. The location system according to claim 4 wherein the token is a magnetic stripe card or a barcode card, and the token reader is a magnetic card reader or a barcode reader.

6. The location system according to claim 3 wherein the first processor means is adapted to shut off the transmitter of said at least one of the portable identification modules if the charging voltage is present for longer than a predetermined period of time.

7. The location system according to claim 1 wherein the first processor means is adapted to vary the interval between the transmission of successive output signals between a first, minimum interval and a second, maximum interval, in a random or pseudo random manner.

8. The location system according to claim 7 wherein the difference between the maximum and minimum intervals is substantially less than the length of both the maximum and minimum intervals.

9. The location system according to claim 8 wherein the duration of each of said output signals from said first processor is less than 1% of the difference between the maximum and minimum intervals.

10. The location system according to claim 1, and further comprising a portable location device which is responsive to the output signals of the identification modules, the portable location device comprising:
    an antenna for acquiring said output signal;
    an adjustable attenuator connected to said antenna, for selectively attenuating said output signals after being acquired by said antenna;
    a receiver connected to the adjustable attenuator;
    fourth processor means; and
    display means,
    the fourth processor means being adapted to store selected identification codes corresponding to identification modules of personnel operating the location device, so that transmission of those identification codes is ignored by the location device; and to generate a display signal when an output signal containing an identification code other than the stored identification codes is received.

11. The portable location device according to claim 10 wherein the fourth processor means is adapted to generate a display on the display means corresponding to the identification code of a received identification signal, and to store the selected identification codes in memory means, the identification codes of subsequently received identification signals being compared with the stored identification codes, and being displayed only if they do not correspond with any of the stored identification codes.

12. The location system according to claim 1 wherein the third processor means of the control station is adapted to store the identification code of each identification module and to relate the stored identification codes to respective personal identification codes of persons issued with the identification modules.

13. The location system according to claim 1 wherein the second processor means of each identification station comprises a plurality of processors which are interconnected, so that each of the plurality of processors can identify a respective identification code from received output signals which overlap at least partially in time.

14. A portable identification module for use in a location system comprising a plurality of the portable identification modules, a plurality of identification stations, and a control station, the portable identification module comprising a transmitter and processor means arranged to store an identification code and to enable the transmitter periodically to transmit an output signal including the identification code to any of said plurality of identification stations so that the position of the identification module can be identified and reported to the control station, the identification module being arranged to be powered by a battery which powers a miner's caplamp and the processor means being adapted to detect connection of the caplamp to a battery charging circuit and to modify said output signal while a charging voltage is present, and to shut off the transmitter if the charging voltage is present for longer than a predetermined period of time.

15. The portable identification module according to claim 14 wherein said portable identification module is housed in the headpiece of said miner's caplamp.

16. The portable identification module according to claim 14 wherein said portable identification module is housed in a housing for a battery pack of said miner's caplamp.

* * * * *